Oct. 16, 1956

J. F. STORM 2,767,360

RATE OF FLOW MEASURING APPARATUS

Filed Jan. 18, 1952

FIG. 1

FIG. 2

INVENTOR.
JOHN F. STORM

BY George H. Fisher

ATTORNEY

United States Patent Office 2,767,360
Patented Oct. 16, 1956

2,767,360

RATE OF FLOW MEASURING APPARATUS

John F. Storm, Minneapolis, Minn., assignor to Minneapolis-Honeywell Regulator Company, Minneapolis, Minn., a corporation of Delaware Application January 18, 1952, Serial No. 267,094

11 Claims. (Cl. 318—28)

This invention is concerned with fuel measuring apparatus and particularly with measuring the rate of change in quantity of a container of fluid. It is therefore an object of the invention to design new and improved apparatus for measuring the rate of change in quantity of a fluid.

Another object of the invention is to design highly accurate apparatus for measuring the rate of change in quantity of a fluid.

Another object of the invention is to design apparatus for measuring the rate of change in quantity of a fluid which is quite similar to presently known fluid measuring apparatus and which is capable of using many of the components of presently known fluid gage apparatus.

A further object of the invention is to design apparatus for measuring the rate of change in quantity of a fluid which is not sensitive to variations in the energizing voltage.

Another object of the invention is to design apparatus for measuring the rate of change in quantity of a fluid using a velocity signal generator but which is not affected by change in resistance of the velocity signal generator windings during the warm up period of the velocity signal generator.

It is a further object of the invention to design apparatus for measuring the rate of change in qauntity of a fluid using a velocity signal generator which reduces the effect of the harmonic frequencies produced by the velocity signal generator.

Another object of the invention is to design apparatus for measuring the rate of change in quantity of a fluid using a velocity signal generator operating upon an amplifier having a phase discriminator in which the phase of the voltage energizing the discriminator stage is of the same phase as the voltage energizing the velocity signal generator. This is accomplished by connecting the primary of the transformer energizing the discriminator stage in series with the energizing winding of the velocity signal generator across the energizing voltage source.

Briefly, the apparatus comprises a velocity signal generator having one of its field windings connected in series with a rebalancing potentiometer so as to not only form a null balancing type of apparatus but also to cause the same current which flows through the velocity signal generator primary winding to flow through the rebalancing potentiometer. The voltage across the velocity signal generator secondary winding is compared with the voltage picked off the rebalancing potentiometer to operate an amplifier and motor to move the wiper arm along the rebalancing potentiometer until the two voltages are equal and opposite. The velocity signal generator armature is rotated at a speed indicative of the rate of change in quantity of the fluid so that the voltage output of the velocity signal generator is dependent upon the rate of change in quantity of the fluid. A filtering circuit is placed in the first stage of the amplifier to feed back the harmonic frequencies in an out-of-phase relation so as to cancel them out.

For a more complete understanding of the invention reference is made to the following detailed description taken in conjunction with the accompanying drawing in which Figure 1 is a schematic diagram of the quantity and rate indicating apparatus; and Figure 2 is a schematic diagram of a modification of a portion of the circuit of Figure 1.

The apparatus shown in the drawing may be divided generally into a rate indicating circuit A and a quantity measuring circuit B. The fluid quantity measuring circuit B may be, and is in fact shown to be, the same type of fluid quantity measuring circuit described and claimed in the copending application of Franzel et al., Serial No. 200,258, filed December 11, 1950, and assigned to the same assignee as the present invention. Briefly, the fluid quantity measuring circuit is energized from a transformer 10 having a primary 11 connected to a source of voltage, not shown. The transformer 10 has a pair of secondaries 12 and 13.

A rheostat 14, having a wiper arm 15, is shown to have one end thereof connected to one terminal of the transformer secondary 12. A potentiometer 16 having a wiper arm 17 is connected between the wiper arm 15 of rheostat 14 and the other terminal of transformer secondary 12. This lower terminal of potentiometer 16 is also connected to ground terminal 20.

Transformer secondary 13 is connected near its upper terminal to ground terminal 20 by means of conductors 21 and 22. A potentiometer 23 having a wiper arm 24 is connected across the lower portion of transformer secondary 13. A potentiometer 25 having a wiper arm 26 is connected between the upper terminal of transformer secondary 13 and wiper arm 24 of potentiometer 23.

A tank 9, having an outlet 8, contains a capacitive type of measuring tank unit 27 having an outer electrode 30 and an inner electrode 31 is shown to be connected between the wiper arm 17 of potentiometer 16 and an input terminal 32 of an amplifier 33. The outer electrode 30 of the measuring tank unit 27 is connected to wiper arm 17 of potentiometer 16 through conductor 34 while the inner electrode 31 of the tank unit 27 is connected to the input terminal 32 of amplifier 33 by means of conductors 35 and 36. The other input terminal 37 of amplifier 33 is connected to ground terminal 40.

A capacitive type compensator tank unit 41 is shown to have an outer electrode 42 and an inner electrode 43. The outer electrode 42 of the compensator tank unit 41 is connected to wiper arm 26 of potentiometer 25 by means of conductor 44. The inner electrode 43 of the compensator tank unit 41 is connected to the input terminal 32 of amplifier 33 by means of conductors 45, 46, 48 and 36. The tank units 27 and 41 are the capacitive type tank units where the inner and outer electrodes serve as capacitor plates with the air or fluid between the electrodes serving as the dielectric with the change in dielectric constant due to replacing the air by fluid or vice versa resulting in a change in capacitance of the tank units.

A fixed capacitor 47 is shown to be connected to wiper arm 26 of potentiometer 25 by means of conductor 50 and is further connected to the input terminal 32 of amplifier 33 by means of conductors 46, 48 and 36. Thus fixed capacitor 47 is connected in parallel with the compensator tank unit 41.

A capacitor 51 is connected near the lower end of transformer secondary 13 by means of conductor 52 and is further connected to input terminal 32 of amplifier 33 by means of conductors 53, 48 and 36.

Amplifier 33 is connected to a motor 54 by means of conductors 55 and 56. The amplifier-motor combination may be of the type which is disclosed and claimed in the Upton patent, 2,423,534, assigned to the same assignee as the present invention. The amplifier is one which is capable of taking a signal of a first or second phase to produce an output of a first or second phase in order to cause reversible operation of the motor.

The motor 54 is connected by means of a mechanical connection 57 to an indicator dial 60 and an indicator needle 61. Motor 54 is also connected by means of mechanical connection 62 to wiper arm 26 of potentiometer 25 for rebalancing purposes.

The theory of operation of this fuel quantity network is that, by design, the signal indication from capacitor 51 is equal and opposite to the signal indication from measuring tank unit 27 when there is no fluid in the tank 9. That is, when the tank 9 is empty wiper arm 26 is at ground potential along potentiometer 25. The voltage on wiper arm 17 with respect to ground potential is in opposition to the voltage on conductor 52 with respect to ground potential. When the product of the voltage across tank unit 27 multiplied by the capacitance of the tank unit 27 equals the product of the voltage across capacitor 51 multiplied by the capacitance of the capacitor the current flow through the two circuits is equal and in opposition and so cancel each other out.

All that remains of the signal indication of tank unit 27 is that indication which is due to fluid between the electrodes. The signal indications from capacitor 47 and compensator tank unit 41 are in opposition to the signal indication from tank unit 27 and through the rebalancing circuit they also become equal in magnitude. Thus if $E_1$ is the voltage across tank unit 27; $E_2$, the voltage across capacitor 51; $E_3$ the voltage across tank unit 41 and capacitor 47; $C_1'$, the empty tank capacitance of tank 27; $C_1''$, the additional capacitance of tank unit 27 due to fluid in the tank; $C_2$, the capacitance of capacitor 51; $C_3$, the capacitance of tank unit 41; and $C_4$ the capacitance of capacitor 47 and the network is in balance the following equations are true:

$$E_1C_1' + E_1C_1'' = E_2C_2 + E_3C_3 + E_4C_4$$

As previously stated $$E_1C_1' = E_2C_2$$

by design. Therefore $$E_1C_1'' = E_3C_3 + E_4C_4$$

The purpose of the compensator tank unit is to partially compensate for changes in dielectric between various fuels. The reason for doing this is because the change in dielectric constant with change in density between various fuels is not always linear and if a partial compensation for the change in dielectric constant is made the circuit will provide an indication largely dependent upon the density of the fluid as well as its height in order that a more accurate indication of the weight of the quantity of fuel might be obtained. This is important in that engines using fuel obtain horsepower by the B. t. u. content of the fuel which varies linearly with the weight of the fuel.

The amount of unbalance signal appearing on the input terminals of the amplifier is going to be dependent upon the rate at which the fuel leaves the outlet pipe 8 in tank 9. The greater the unbalance signal on the amplifier the greater will be its output signal to the motor 54. The greater the energizing voltage to motor 54 the more rapid will be its rotation. The motor 54 may be a capacitive split phase type of induction motor which has a varying speed of rotation which change in energizing voltage. The speed of this motor rotation is therefore dependent upon the rate of change of the quantity of fluid in the tank 9.

This motor rotation is then inserted into network A of the circuit of Figure 1 for deriving an indication of the rate of change of the quantity of fluid in the tank 9.

Network A is shown to be energized by a transformer 70 having a primary 71 connected to a source of power, not shown. Transformer 70 further has a secondary 72 for the purpose of energizing the remainder of network A.

Across the two terminals of transformer secondary 72 are connected, in series, a rebalancing potentiometer 85, having a wiper arm 86 and a primary winding 83 of a velocity signal generator 84. The connection between rebalancing potentiometer 85 and primary winding 83 of the velocity signal generator is connected to ground terminal 87.

The velocity signal generator 84 is the type of generator having a primary winding 83 and a secondary winding 90 with no transformer action existing between them with the primary winding energized under normal conditions. However, when the rotor 91 is rotated the inductive field from the primary is bent and induces a voltage in the secondary winding. The magnitude of the voltage induced in the secondary winding, the energizing current through the primary winding being constant, is determined by the speed of rotation of the rotor. Reversal in the phase of the primary current or in the direction of rotation of the rotor reverses the phase of the secondary voltage. The velocity signal generator will henceforth be called a velocity generator. The rotor 91 of velocity generator 84 is connected by a mechanical connection 92 to motor 54 of network B such that the rotor 91 of the velocity generator is rotated by motor 54 at a speed indicative of the rate of change of quantity of fluid in the tank 9, shown in network B. One terminal of field winding 90 of the velocity generator is connected to a ground terminal 93.

The potentiometer 85 is a rebalancing potentiometer. The ungrounded terminal of field winding 90 of the velocity generator is connected through a resistor 94, a capacitor 95 and conductor 123 to input terminal 96 of an amplifier 97. The other input terminal 100 of amplifier 97 is connected to ground terminal 101.

The wiper arm 86 of rebalancing potentiometer 85 is connected through a capacitor 102 in series with a resistor 103 to ground terminal 104. The connection between the capacitor 102 and resistor 103 is connected through a resistor 105, the capacitor 95 and conductor 123 to the input terminal 96 of amplifier 97. It can be seen by looking at Figure 1 that the polarity of the voltage across potentiometer 85 is of the opposite phase with respect to the polarity of the voltage across field winding 83 of the velocity generator since the potentiometer is on one side of the ground terminal while the field winding is on the other. However, in inducing the voltage from field winding 83, rotor 91 and from there to field winding 90 the voltage across winding 90 has been shifted slightly in phase with respect to the voltage across winding 83. The capacitor 102 and resistor 103 serve as a phase shifting circuit in order to shift the phase of the signal from rebalancing potentiometer 85 such that it is exactly 180° out of phase with the signal indication which is due to velocity generator 84. Resistors 94 and 105 are summing resistors while capacitor 95 is for the purpose of blocking any direct voltages.

It can be seen that the voltage indication from the velocity generator 84 and the rebalancing potentiometer 85 are thus compared in the input circuit of amplifier 97 such that a difference in voltage indications from the two inputs results in energization of the amplifier 97 of either a first or a second phase to provide a reversible output from the amplifier 97.

Amplifier 97 has its output terminals connected to a motor 106 by means of conductors 107 and 110. The motor 106 is of a type which is capable of reversible rotation depending upon the phase of the signal input.

Motor 106 is connected by means of a mechanical connection 111 to an indicator dial 112 having an indicator pointer 113. The pointer 113 moves with rotation of the motor 106 and indicates the rate at which the fluid is leaving the tank 9. Motor 106 is also connected to the wiper arm 86 of rebalancing potentiometer 85 by means of mechanical connection 114.

When an unbalance voltage appears across the input terminals of amplifier 97, the amplifier is energized to cause operation of motor 106 in either a first or a second direction to move the pointer along the indicator dial 112 and further to vary the output voltage from rebalancing potentiometer 85 until the network is again balanced. As a result, there is provided here a null balancing type of circuit and as a result any variation in magnitude of the energizing voltage does not appreciably effect the indications read on the indicator dial 112. It is seen that the voltage across both the potentiometer 85 and the field winding 83 of velocity generator 84 are affected equally so that a large variation in the magnitude of the energizing voltage results in very little error on the indicator.

It is well known that when a device such as a motor or generator first starts up the temperature of the device is much colder that after it has had an opportunity to run for several minutes. The field windings are thus much colder and the resistance is lower than the resistance will be in the windings after the motor or generator has had an opportunity to become warmed up to its operating temperature. With less resistance across the field winding the current is higher. In a velocity generator the voltage in the secondary, or in the second field winding 90, is a function of the current in the primary field winding 83. With a higher current in the field winding 83 when the velocity generator first starts rotating the voltage across field winding 90 is higher and results in a signal of greater magnitude into amplifier 97. By connecting the rebalance potentiometer 85 in series with the field winding 83 the current flowing through the field winding 83 of velocity generator 84 is the same as the current flowing through the potentiometer 85. The resistance of the potentiometer 85 remains the same and so with increased current flow the voltage across the potentiometer is greater and increases in the same proportion as the voltage across winding 90 of the velocity generator. Thus, when the velocity generator starts up cold, resulting in a greater voltage across field winding 90 for the same rate of fluid flow, the voltage across rebalancing potentiometer 85 is increased by the same proportion. Therefore, there is no resultant error due to the warm up time of the velocity generator. Also, there is no danger of calibrating the circuit while a velocity generator is cold and then having it go out of calibration when the velocity generator warms up. It is thus seen that there has been designed here a circuit which is independent of the change in resistance of the velocity generator due to any change in its temperature.

With increased rate of flow, the rotor 91 of velocity generator 84 rotates more rapidly to induce a larger voltage across field winding 90 so the resultant voltage across the input terminals of amplifier 97 is of the same phase as the voltage across field winding 90. This results in the amplifier 97 causing rotation of motor 106 to move wiper arm 86 upwardly along potentiometer 85 to increase the output voltage from the potentiometer until it again becomes equal to the output voltage from velocity generator 84, resulting in deenergizing the motor and stopping the rotation of motor 106. If the rate of fluid flow should decrease the rotor of velocity generator 84 rotates more slowly, inducing a smaller voltage into field winding 90 so that the voltage in field winding 90 is now less than the voltage from the rebalancing potentiometer 85 so that the amplifier 97 is energized in the second direction to cause reverse rotation of motor 106 and move wiper arm 86 downwardly along rebalancing potentiometer 85 until the two output voltages are again equal, at which time the amplifier and motor are deenergized.

As can be seen the amplifier must be capable of distinguishing between an input signal of a first and a second phase in order to produce an output voltage of either a first or a second phase to cause reversible operation of the motor. Such an amplifier motor combination may be found in the Upton patent, 2,423,534, assigned to the same assignee as the present invention.

The velocity generator 84, due to the rotation of its rotor 91 induces not only a voltage of the fundamental frequency into the field winding 90 but also induces voltages of the various harmonic frequencies in the field winding 90. These harmonics if permitted to remain in the circuit would load up the amplifier and cause decreased sensitivity. As a result, a twin-T filtering circuit is connected between the plate and grid of the first tube in the amplifier. As shown in the drawing, the first tube in the amplifier is designated as 115 and has a plate 116 and a grid 117. The grid 117 is connected to the input terminal 96 of amplifier 97. The plate 116 of the tube 115 is connected to the grid 117 in a feedback filtering circuit through resistors 120 and 121, in series, and conductors 122 and 123. A pair of capacitors 124 and 125 are connected in series across the resistors 120 and 121. The junction between the resistors 120 and 121 is connected to a ground terminal 126 through a capacitor 127. The junction between the capacitors 124 and 125 is connected to ground terminal 126 through resistor 130. As easily seen, the resistors 120, 121 and 130, and capacitors 124, 125 and 127 form a twin-T filtering circuit. By proper selection of the various components in this twin-T circuit the harmonic frequencies are fed back into the input circuit of the amplifier in an out-of-phase relation to the harmonic frequencies coming into the amplifier from the velocity generator winding 90 so as to cancel out and leave only the signal of fundamental frequency to pass through the amplifier and affect the operation of the motor.

*Modification of Figure 2*

The modification of Figure 2 contains similar numerical designations for similar components found in Figure 1.

The amplifier 97 is shown in Figure 2, to have a phase discriminator stage 140 comprising a pair of electron tubes 141 and 142. Electron tube 141 has a plate 143, a control electrode 144 and a cathode 145 while the electron tube 142 has a plate 146, a control electrode 147 and a cathode 150. The cathodes are shown to be tied together and to ground terminal 151. The plates 143 and 146 of the electron tubes 141 and 142, respectively, are energized by a transformer 152 having a primary winding 153 and a center tapped secondary winding 154. The center tap 155 on transformer secondary 154 is shown to be connected through conductor 107 to motor 106. The other connection to motor 106 is shown to be connected to ground, which is the ground terminal 151 connected to the cathodes of the two electron tubes 141 and 142.

Transformer primary 153 of the transformer 152 which provides the energization for the tubes 141 and 142 of the discriminator stage 140 is shown to be connected across transformer secondary 72 in series with potentiometer 85 and field winding 83 of velocity generator 84 by conductors 156 and 157. As a result, the various components across the transformer secondary 72 are as follows; from the upper terminal of transformer secondary 72 through conductor 156, transformer primary 153, conductor 157, potentiometer 85, field winding 83 of velocity generator 84 and back to the lower terminal of transformer secondary 72. As a result, the phase of the voltage across transformer primary 153 as measured from the lower to the upper terminal of the primary is exactly the same as the phase of the voltage across velocity generator winding 83 as measured from the upper to the lower terminal of the winding in order to insure more sensitive and accurate operation of the amplifier 97 with change in signal voltage from the velocity generator 84 and the rebalancing potentiometer 85. Since the discriminator stage 140 is energized in phase with the voltage energizing the rebalancing potentiometer 85 and velocity generator 84 the voltages appearing on the grids 144 and 147 of tubes 141 and 142 of the discriminator stage are either in phase or 180 degrees out of phase with respect to the voltages on the plates of the two tubes. Consequently either one tube or the other will conduct and there will be no possible simultaneous operation by the two tubes in the discriminator stage. Also, by having the grid voltages either in or out of phase with the plate voltages on the tubes it is possible to get maximum signal output to the motor.

It is thus seen that a rate measuring circuit has been devised which makes use of the high accuracy of the presently known fuel quantity measuring circuits and a velocity generator while at the same time eliminating any errors which might be due to change in energizing voltages, warmup period of the velocity generator or harmonics generated by the velocity generator.

It is realized that modifications may be made by those skilled in the art without departing from the spirit of the invention and it is therefore intended that the limits of the invention be defined only by the scope of the appended claims.

I claim:

1. Null balancing measuring apparatus comprising in combination: means comprising an energizing winding and an output winding and means for varying the voltage across said output winding for a given energization of said energizing winding; variable impedance means having input terminals and output terminals; a source of voltage having a pair of output terminals; means connecting said energizing winding and the input terminals of said impedance means in series circuit to the output terminals of said source of voltage so that the same current flows through said energizing winding and said input terminals so that a change in impedance of said series circuit changes the current flow through both said energizing winding and said impedance means an equal amount; means responsive to a condition for controlling said voltage varying means to vary the voltage across said output winding; and means responsive to the relative values of the voltage across said output winding and that across the output terminals of said variable impedance means for adjusting said variable impedance means until the voltage across said output terminals is equal in magnitude and opposite to the voltage across said output winding.

2. Null balancing measuring apparatus comprising in combination: a velocity signal generator comprising an energizing winding and an output winding and a rotor for varying the voltage across said output winding for a given energization of said energizing winding; a potentiometer having input terminals and output terminals; a source of voltage having a pair of output terminals; means connecting said energizing winding and the input terminals of said potentiometer in series circuit to the output terminals of said source of voltage so that the same current flows through said energizing winding and through the input terminals to thereby cause a change in impedance of said series circuit to affect said energizing winding and said potentiometer in an equal amount; means responsive to a condition for controlling said rotor to vary the voltage across said output winding; and means responsive to the relative values of the voltage across said output winding and that across said output terminals for adjusting said potentiometer until the voltage across said output terminals is equal in magnitude and opposite to the voltage across said output winding.

3. Null balancing measuring apparatus comprising in combination: means comprising an energizing winding and an output winding and means for varying the voltage across said output winding for a given energization of said energizing winding; variable impedance means having input terminals and output terminals; amplifier means having a phase discriminator as its output stage; a transformer having a primary winding and a secondary winding having end terminals; means connecting said energizing winding, said input terminals and said discriminator in series circuit to the end terminals of said secondary winding so that the same current flows through said energizing winding as flows through the input terminals to thereby compensate for changes in impedance of said series circuit and the phase of the current flowing through said discriminator remains the same as that flowing through the energizing winding and the input terminals to thereby insure maximum sensitivity; means responsive to a condition for controlling said voltage varying means to vary the voltage across said output winding; means connecting said amplifier means to said output winding and said output terminals such as to be responsive to the relative values of the voltage across said output winding and that across said output terminals; and means connecting said amplifier means to said variable impedance means for adjusting said variable impedance means until the voltage across said output terminals is equal in magnitude and opposite in phase to the voltage across said output winding.

4. Null balancing measuring apparatus comprising in combination: a velocity signal generator comprising an energizing winding and an output winding and a rotor for varying the voltage across said output winding for a given energization of said energizing winding; a potentiometer having input terminals and output terminals; amplifier means having a phase discriminator as its output stage; a transformer having a primary winding and a secondary winding with a pair of terminals; means connecting said energizing winding, said input terminals and said discriminator in series circuit to the pair of terminals of said secondary winding so that the same current flows through said energizing winding as flows through the input terminals to thereby compensate for variation of the impedance of said series circuit and the phase of the current flowing through said discriminator remains the same as that flowing through the energizing winding and the input terminals to insure maximum sensitivity; means responsive to a condition for controlling said rotor to vary the voltage across said output winding; means connecting said amplifier means to said output winding and said output terminals such as to be responsive to the relative values of the voltage across said output winding and that across said output terminals; and means connecting said amplifier means to said potentiometer for adjusting said potentiometer until the voltage across said output terminals is equal in magnitude and opposite in phase to the voltage across said output winding.

5. Null balancing measuring apparatus comprising in combination: means comprising an energizing winding and an output winding and means for varying the voltage across said output winding for a given energization of said energizing winding; variable impedance means having input terminals and output terminals; a source of voltage; means connecting said energizing winding and the input terminals of said impedance means to said source of voltage so that the same current flows through said energizing winding as flows through the input terminals to thereby compensate for a change in impedance of either said energizing winding or said impedance means; means responsive to a condition for controlling said voltage varying means to vary the voltage across said output winding; and means responsive to the relative values of the voltage across said output winding and that across the output terminals of said variable impedance means for adjusting said variable impedance means until the voltage across said output terminals is equal in magnitude and opposite to the voltage across said output winding.

6. Null balancing measuring apparatus comprising in combination: a velocity signal generator comprising an energizing winding and an output winding and a rotor for varying the voltage across said output winding for a given energization of said energizing winding; a potentiometer having input terminals and output terminals; a source of voltage; means connecting said energizing winding and the input terminals of said potentiometer to said source of voltage so that the current flowing through said energizing winding is the same as that flowing through the input terminals to thereby compensate for a change in impedance of said energizing winding; means responsive to a condition for controlling said rotor to vary the voltage across said output winding; and means responsive to the relative values of the voltage across said output winding and that across said output terminals for adjusting said potentiometer until the voltage across said output terminals is equal in magnitude and opposite to the voltage across said output winding.

7. Null balancing measuring apparatus comprising in combination: means comprising an energizing winding and an output winding and means for varying the voltage across said output winding for a given energization of said energizing winding; variable impedance means having input terminals and output terminals; amplifier means having a phase discriminator as its output stage; an alternating current source of voltage; means connecting said energizing winding, said input terminals and said discriminator to said source of voltage so that the current flowing through said energizing winding is the same as that flowing through the input terminals to thereby compensate for change in impedance of said energizing winding and the phase of the current flowing through said discriminator is the same as that flowing through the energizing winding and the input terminals to thereby provide maximum sensitivity; means responsive to a condition for controlling said voltage varying means to vary the voltage across said output winding; means connecting said amplifier means to said output winding and said output terminals such as to be responsive to the relative values of the voltage across said output winding and that across said output terminals; and means connecting said amplifier means to said variable impedance means for adjusting said variable impedance means until the voltage across said output terminals is equal in magnitude and opposite in phase to the voltage across said output winding.

8. Null balancing measuring apparatus comprising in combination: means comprising an energizing winding and an output winding having a pair of terminals a first of which is connected to a reference voltage point, means for varying the voltage across said output winding for a given energization of said energizing winding; variable impedance means having a pair of input terminals and a pair of output terminals a first of which is connected to the reference potential point; a source of voltage having a pair of output terminals; means connecting said energizing winding and the input terminals of said impedance means in a series circuit to the pair of output terminals of said source of voltage so that the current flowing through said energizing winding is the same as that flowing through the input terminals of said variable impedance means; means connecting the common connection of said energizing winding and the input terminals of said variable impedance means to the reference voltage point; means responsive to a condition for controlling said voltage varying means to vary the voltage across said output winding; and voltage responsive means having a pair of input terminals connected one to the reference voltage point and the other to the second output terminal of said output winding and to the second output terminal of said variable impedance means, said voltage responsive means being responsive to the relative values of the voltage across said output winding and that across the output terminals of said variable impedance means for adjusting said variable impedance means until the voltage across the output terminals of said variable impedance means is equal in magnitude and opposite to the voltage across said output winding.

9. Null balancing measuring apparatus comprising in combination: a velocity signal generator comprising an energizing winding and an output winding having a pair of terminals a first of which is connected to a reference voltage point and a rotor for varying the voltage across said output winding for a given energization of said energizing winding; a potentiometer having input terminals and a pair of output terminals a first of which is connected to the reference voltage point; a source of voltage having a pair of output terminals; means connecting said energizing winding and the input terminals of said potentiometer in a series circuit to said source of voltage so that the current flowing through said energizing winding is the same as that flowing through the input terminals of said potentiometer; means connecting the common connection of the input terminals of said potentiometer and said energizing winding to the reference voltage point; means responsive to a condition for controlling said rotor to vary the voltage across said output winding; and voltage responsive means having a pair of input terminals a first of which is connected to the reference voltage point and the second of which is connected to the second output terminal of said output winding and to the second output terminal of said potentiometer, said voltage responsive means being responsive to the relative values of the voltage across said output winding and that across said output terminals for adjusting said potentiometer until the voltage across the output terminals of said potentiometer is equal in magnitude and opposite to the voltage across said output winding.

10. Null balancing measuring apparatus comprising in combination: means comprising an energizing winding and an output winding having a pair of terminals a first of which is connected to a reference voltage point, and means for varying the voltage across said output winding for a given energization of said energizing winding; variable impedance means having input terminals and a pair of output terminals a first of which is connected to the reference voltage point; amplifier means having a phase discriminator as its output stage and having a pair of input terminals a first of which is connected to the point of reference voltage; a transformer having a secondary winding with a pair of terminals; means connecting said energizing winding, said input terminals of said variable impedance means and said discriminator in a series circuit to the pair of terminals of said transformer second winding so that the current flowing through said energizing winding is the same as that flowing through the input terminals of said variable impedance means and the phase of the current flowing through said discriminator is the same as that flowing through the energizing winding and the input terminals of said variable impedance means; means connecting the common connection of said energizing winding and the input terminals of said variable impedance means to the reference voltage point; means responsive to a condition for controlling said voltage varying means to vary the voltage across said output winding; means connecting the second input terminal of said amplifier means to the second terminal of said output winding and to the second output terminal of said variable impedance means, said amplifier means being responsive to the relative values of the voltage across said output winding and that across the output terminals of said variable impedance means; and means connecting the output of said amplifier means to said variable impedance means for adjusting said variable impedance means until the voltage across the output terminals of said variable impedance means is equal in magnitude and opposite in phase to the voltage across said output winding.

11. Null balancing measuring apparatus comprising in combination: a velocity signal generator comprising an energizing winding and an output winding having a pair of terminals, a first of which is connected to a reference voltage point, and a rotor for varying the voltage across said output winding for a given energization of said energizing winding; a potentiometer having input terminals and a pair of output terminals a first of which is connected to the reference voltage point; amplifier means having a phase discriminator as its output stage and having a pair of input terminals a first of which is connected to the reference voltage point; a transformer having a secondary winding with a pair of terminals; means connecting said energizing winding, the input terminals of said potentiometer and said discriminator in a series circuit to the pair of terminals of said transformer secondary winding so that the current flowing through said energizing winding is the same as that flowing through the input terminals of said potentiometer and the phase of the current flowing through said discriminator is the same as that flowing through the energizing winding and the input terminals of said potentiometer; means connecting the common connection of said energizing winding and the input terminals of said potentiometer to the reference voltage point; means responsive to a condition for controlling said rotor to vary the voltage across said output winding; means connecting the second input terminal of said amplifier means to the second terminal of said output winding and to the second output terminal of said potentiometer, said amplifier means being responsive to the relative values of the voltage across said output winding and across the output terminals of said potentiometer; and means connecting said amplifier means to said potentiometer for adjusting said potentiometer until the voltage across said output terminals is equal in magnitude and opposite in phase to the voltage across said output winding.

References Cited in the file of this patent
UNITED STATES PATENTS

| | | |
|---|---|---|
| 2,519,416 | Townsend | Aug. 22, 1950 |
| 2,547,105 | Williams | Apr. 3, 1951 |
| 2,573,840 | Grass | Nov. 6, 1951 |
| 2,604,615 | Peterson et al. | July 22, 1952 |
| 2,630,282 | Halpert | Mar. 3, 1953 |
| 2,648,041 | Perkins | Aug. 4, 1953 |
| 2,648,982 | Condon | Aug. 18, 1953 |
| 2,689,932 | Hornfeck | Sept. 21, 1954 |
| 2,698,406 | Arrott | Dec. 28, 1954 |